Aug. 17, 1965   A. LIEB   3,201,633

ELECTROLUMINESCENT CAPACITOR

Filed Nov. 29, 1962

INVENTOR.
ALBERT LIEB
BY
ATTORNEY

United States Patent Office 3,201,633
Patented Aug. 17, 1965

3,201,633
ELECTROLUMINESCENT CAPACITOR
Albert Lieb, Stuttgart-Bad Cannstatt, Germany, assignor to International Standard Electric Corporation, New York, N.Y., a corporation of Delaware
Filed Nov. 29, 1962, Ser. No. 240,805
Claims priority, application Germany, Dec. 2, 1961, St 18,634
13 Claims. (Cl. 313—108)

This invention relates to an electroluminescent capacitor for indicating symbols, such as letters or numbers.

In a familiar luminescent capacitor of this type, the electroluminescent material is applied in the form of a symbol to only that part of the capacitor that is to radiate light. The drawback of such capacitors is that substantially greater power is required for illuminating the desired symbols. This is a particularly difficult problem when the power for producing the electroluminescence is supplied by battery.

In another present embodiment of such capacitors, one of the conductive electrodes, usually the opaque electrode facing away from the observer, is designed in the shape of the symbols to be represented. In order to indicate the individual symbols, however, electrical contacts must be set up for each symbol design. This procedure is complicated and time consuming and the manufacturing cost is thereby substantially increased.

Another known luminescent capacitor is one in which additional insulating material is applied between the conductive layers in the areas where emission is to be suppressed, so that the conductive layers are spaced more closely together at the fluorescent surfaces than at the non-fluorescent areas. A problem with these capacitors is that it is very difficult to produce a sharp definition between the fluorescent and non-fluorescent sections. In order to make the differences between these portions sufficiently large, the spacing between electrodes must vary considerably. This leads to a blurring of the luminescent definition at the crossover points or junctions. Furthermore, it is difficult to vary the spacing between the conductive electrodes to any great degree in the case of small luminous designs. Another difficulty lies in providing the surfaces with a conductive layer parallel to the direction of observation.

It is therefore the primary object of the present invention to provide an improved electroluminescent capacitor having greater efficiency, simplicity, and sharpness of definition. This is achieved by a novel structure having a solid dielectric containing an electroluminescent fluorescent material between two equidistantly spaced conductive layers, with the parts of the electroluminescent capacitor that indicate the symbols having a dielectric material of a substantially different dielectric constant than that of the other parts of the capacitor.

The invention will now be described and other objects and advantages will become apparent with the aid of the embodiments shown in the accompanying drawings, wherein.

Figure 1:
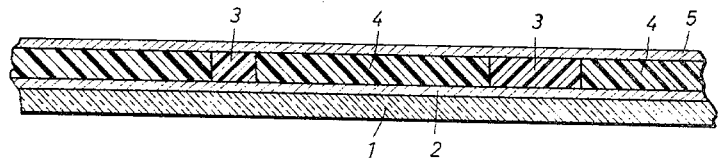
FIG. 1 shows the cross-section of a luminescent capacitor according to the invention.

A transparent electrically conductive layer 2, such as a vaporized tungsten or a tin-oxide is shown coated on a transparent support 1, which may be a glass or mica plate. Dielectric layers 3 and 4 with different dielectric constants are placed between layer 2 and another conductive layer 5, such as an evaporated aluminum layer or a metal foil or sheet. Layer 3 includes a suitable luminescent material and is shaped to match the form of the symbols to be indicated. In the embodiment, the surface area of layer 3 is smaller and the dielectric constant is considerably higher than that of layer 4. In a special embodiment, layer 4 can be made light-absorbent, by using admixtures of dark varnish for example. This increases the contrast between luminescent and non-luminescent portions.

Layer 3 may consist of a material of high dielectric constant, such as an epoxy resin or polyester, in which the luminescent material is embedded. In order to make the dielectric constant still higher, substances of very high dielectric constants can be mixed with layer 3 and combined with a suitable binding agent into a single layer. For example, the epoxy resin of layer 3 may include barium titanate or strontium titanate embedded as additional substances. Layer 4 has a low dielectric constant which may be formed of polyester, oppanol, or high molecular polyethylenes. Gases, such as air or a vacuum, can also be used for layer 4. When the luminescent capacitor is operating, electroluminescence occurs only at those areas where the high dielectric constant layer 3 is located between electrodes 1 and 5. The power drain also occurs substantially only at the surface area of layer 3 indicating the symbols.

Figure 2:
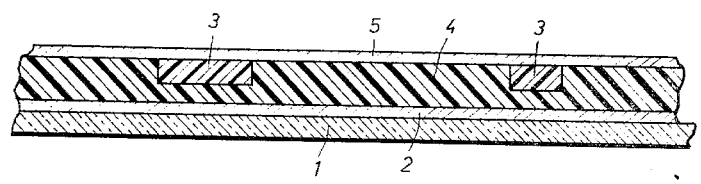
FIG. 2 shows a variation using a thinner high dielectric layer.

FIG. 2 shows another embodiment wherein the reference numbers of FIG. 1 also apply. In contrast to the embodiment in FIG. 1, high dielectric constant layer 3 is thinner than layer 4. This may be produced by pressing or spraying substances of high dielectric constant, such as barium titantate or strontium titanate together with a suitable high dielectric binding agent, epoxy resin, for example, onto electrode 5, which may be in the form of a sheet-metal plate matching the design to be represented. The luminescent substance, embedded in a low dielectric thermoplastoic material 4, such as polystyrol, or in a plastic material such as oppanol, is applied to support 1, which is provided with conductive layer 2. It can be applied by spreading or spraying on the above substances dissolved in a suitable agent. Electrode 5 with the design of substance 3 on it is then pressed into layer 4. When a thermoplastic substance is used, heat is applied at the same time. Electroluminescence and power drain occur only at those areas of the electroluminescent capacitor between the electrodes which include high dielectric constant layer 3.

Figure 3:
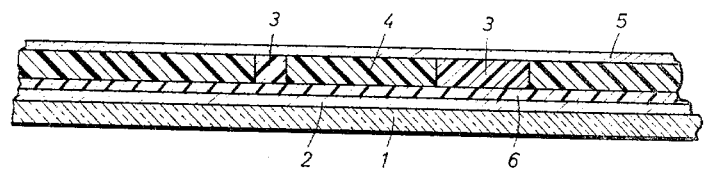
FIG. 3 is another variation having an added dielectric layer.

FIG. 3 shows another embodiment using the same reference numerals. An additional dielectric layer 6 is inserted between combined layers 3 and 4 and transparent conductive layer 2 located on support 1. Provision is made for embedding the luminescent substance in this added layer. Layer 4 differs from the other layers in that it has plastic or thermoplastic properties, whereas layers 6 and 3 do not. In manufacturing the capacitor, the elements consisting of parts 3, 4, 5, and 1, 2, 6 are separately produced in the manner described in the example of FIG. 2 and the two halves are pressed together under pressure, and, in the case of a thermoplastic substance, includes simultaneous application of heat. The spacing between electrodes of such an electroluminescent capacitor is determined by the thickness of the plastic layers 3 and 6. Here it is particularly simple to achieve uniform electrode spacing and illumination of the design. The invention also provides for the introduction of additional layers with different properties between layers 3, 4 and layer 6. For example, such an additional layer may be optically opaque and consist of a thin layer of varnish. By applying such a layer, the design can become invisible when the electroluminescent power is switched off.

Figure 4:
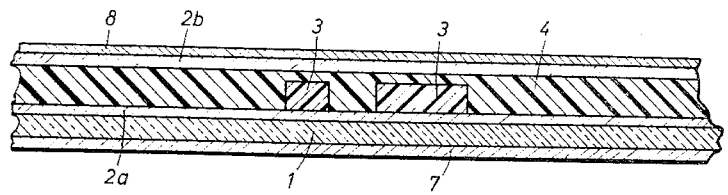
FIG. 4 shows a further form of the invention.

FIG. 4, using the same reference numerals as the previous embodiments, shows an embodiment of the invention in which enamel or glass is used as the dielectric. An enamel or glass layer 7 is placed on a support such as a sheet metal plate 1. The next layer 2a is electrically conductive. In order to make the luminous density of the capacitor as large as possible, layer 2a is provided with high reflecting power. The layer, for example, is formed of vaporized aluminum. Layer 2a can also be optically transparent and layer 7 will then have a high optical reflection. Layer 2a may consist, for example, of electrically conductive transparent tin oxide and layer 7 may be of white enamel. Layer 4 consists of a substance of low dielectric constant which may be a suitable selected enamel. The material of layer 3 has a substantially higher dielectric constant, such as an enamel containing or embedded with barium titanate. The surface area of layer 3 is smaller than that of layer 4. On layer 4 there is an electrically conductive transparent layer 2b, tin oxide, for example, and, if necessary, another electrically insulating enamel or glass layer 8, which is sufficiently transparent for optical rays and serves as an electrical and mechanical protective layer. Parts of layer 4 may consist entirely or partially of air or a vacuum. For example, layer 4 may be porous, or just those parts of this layer immediately facing layer 2b may be formed of enamel or glass, while the remainder consists of air or a vacuum.

While several embodiments have been illustrated, it is apparent that the invention is not limited to the exact form or uses shown and that many other variations may be made in the particular design and configuration without departing from the scope of the invention as set forth in the appended claims.

What is claimed is:

1. An electroluminescent capacitor to indicate symbols comprising a pair of equidistant electrically conductive layers, one of said conductive layers being transparent, first and second dielectric layers arranged between said conductive layers, said second dielectric layer being in the form of said symbols and having a dielectric constant higher than that of said first dielectric layer, and electroluminescent material included in one of said dielectric layers.

2. An electroluminescent capacitor according to claim 1, wherein the portion of the surface of the capacitor adjacent one conductive layer occupied by said higher dielectric constant layer is smaller than that of the first dielectric layer.

3. An electroluminescent capacitor according to claim 2 wherein said first dielectric layer extends fully across the space between said conductive layers and said second dielectric layer extends for a portion of the space therebetween, said first dielectric layer occupying the entire surface adjacent the other conductive layer.

4. An electroluminescent capacitor according to claim 2, wherein one of the dielectric layers is a plastic material.

5. An electroluminescent capacitor according to claim 2, including an additional layer between one of said conductive layers and said dielectric layers, the luminescent material being embedded in the additional layer.

6. An electroluminescent capacitor according to claim 2, wherein said higher dielectric constant layer includes barium titanate.

7. An electroluminescent capacitor according to claim 2, wherein said higher dielectric constant layer includes strontium titanate.

8. An electroluminescent capacitor according to claim 2 including an opaque layer between one of said conductive layers and said dielectric layers.

9. An electroluminescent capacitor according to claim 2, wherein one of said dielectric layers comprises enamel.

10. An electroluminescent capacitor according to claim 2, wherein one of said dielectric layers comprises glass.

11. An electroluminescent capacitor according to claim 2 including a layer of glass on the outer surface of said transparent conductive layer.

12. An electroluminescent capacitor according to claim 4, wherein one of the dielectric layers is a thermoplastic material.

13. An electroluminescent capacitor according to cliam 11 including a further glass layer on the outer surface of the other conductive layer and a metallic base layer thereover.

References Cited by the Examiner

UNITED STATES PATENTS 2,919,366  12/59  Mash.
2,922,912  1/60  Miller.

FOREIGN PATENTS 1,155,597  5/58  France.

GEORGE N. WESTBY, *Primary Examiner.*